Sept. 16, 1969     A. R. GETZIN     3,467,257
EXPANSIBLE-COMPRESSIBLE UNIT FILTER ASSEMBLY
Filed Aug. 9, 1966
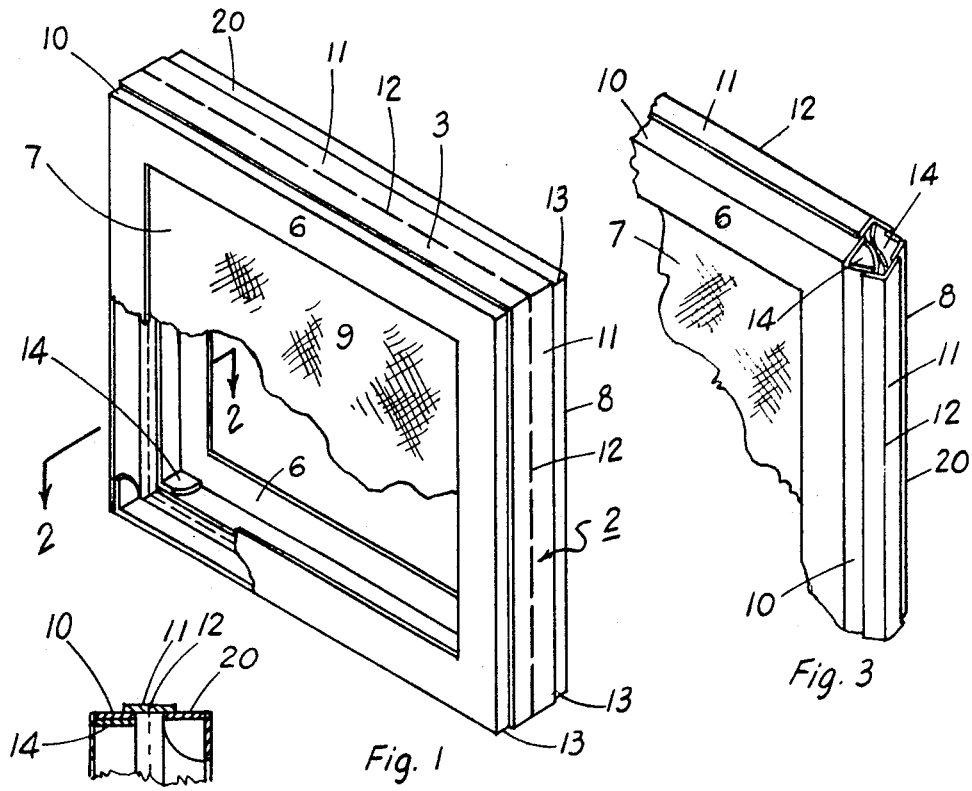
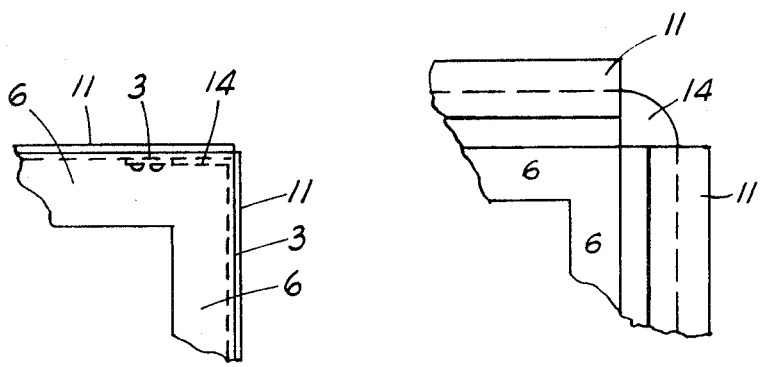
INVENTOR.
Allan R. Getzin
BY
Ralph B. Brick United States Patent Office 3,467,257
Patented Sept. 16, 1969

3,467,257
EXPANSIBLE-COMPRESSIBLE UNIT
FILTER ASSEMBLY
Allan R. Getzin, Jeffersontown, Ky., assignor to American Air Filter Company, Inc., Louisville, Ky., a corporation of Delaware
Filed Aug. 9, 1966, Ser. No. 571,344
Int. Cl. B01d 35/00, 29/04
U.S. Cl. 210—484                                    6 Claims

ABSTRACT OF THE DISCLOSURE

A unit filter assembly including a flow-through border frame member formed from stiff sheet-like material and having fold means to permit expansion and compression of such border frame member, the border frame member receiving the edges of filter medium of an expansible-compressible nature therein.

---

The present invention relates to a filter assembly, and more particularly, to an improved arrangement for a filter assembly of the unit type which includes an open face border frame member of the flow-through type having filter medium disposed therein to remove contaminant particles from a fluid stream passed therethrough.

In accordance with the features of the present invention, a novel unit filter arrangement is provided which is expansible-compressible in nature to permit a maximum number of units to be stored in a given space and to permit such units to be readily set up for operational use upon removal from storage. In addition, the present invention provides a unit filter assembly which is economical to manufacture, sturdy in construction, efficient in operation, and adaptable to a variety of uses.

Various other features of the present invention will become obvious to one skilled in the art upon reading the disclosure set forth hereinafter.

More particularly, the present invention provides a unit filter assembly comprising: a border frame means defining an open upstream and downstream face to permit fluid flow therethrough, the border frame means including base and opposed side wall members arranged so that the inner faces thereof define a continuous channel; means to facilitate movement of opposed side wall members of the border frame means toward and away from each other to permit expansion and compression of the continuous channel; and expansible-compressible filter medium disposed transverse the direction of fluid flow between the upstream and downstream faces of the border frame means, the edges of the filter medium engaging in the continuous channel of the border frame means.

It is to be understood that various changes can be made by one skilled in the art in the arrangement, form, and construction of the apparatus disclosed herein without departing from the scope or spirit of the present invention.

Referring to the drawings which disclose one advantageous embodiment of the present invention:

FIGURE 1 is a partially broken away isometric view of a novel unit filter assembly of the present invention;

FIGURE 2 is a partial plan view of a portion of a corner of the unit filter frame of FIGURE 1 taken in a plane passing through line 2—2 of FIGURE 1;

FIGURE 3 is a partial isometric view of a corner of the unit of FIGURE 1 showing the same in partially collapsed position;

FIGURE 4 is a plan view of a portion of one corner of the unit of FIGURE 1; and

FIGURE 5 is a development view of one half of a frame member utilized to make up the border frame unit of FIGURE 1.

As can be seen in the drawings, the filter assembly broadly designated by reference numeral 2 comprises a flow-through border frame including base wall member 3 and spaced side wall members 6 extending substantially at right angles from such base wall member. The border frame, which can be fabricated from any suitable sturdy and advantageously disposable material such as chipboard or cardboard, serves to define opposed faces 7 and 8, one of which serves as an upstream face and the other a downstream face to permit fluid flow therethrough. As will be noted, the base wall member 3 and side wall members 6 of frame 2 are so disposed that the inner faces thereof serve to define a continuous U-shaped channel which surrounds the path of fluid flow. Although the border frame in the illustrated embodiment of the invention is of rectangular contour, it is to be understood that the features of the present invention can be incorporated in assemblies wherein the border frames are of other contours if the occasion so warrants.

Disposed transverse the direction of fluid flow between face 7 and face 8 of the border frame is a flat filter medium pad 9. The material from which filter pad 9 is formed can be selected in accordance with the particular results desired and can be any one of several known types of expansible-compressible material available in the filter art. For example, filamentous glass fiber mat can be used effectively so long as it has the property of being expansible-compressible in nature. Pad 9 is contoured to conform with the contour of the border frame when in set up position and is sized so that the edges of the pad engage in the continuous U-shaped channel of the border frame.

In accordance with the present invention, border frame 2 is provided with means to facilitate movement of opposed side wall members 6 of the border frame towards and away from each other to permit lateral expansion and compression of the continuous U-shaped channel. As can be seen in FIGURE 1 of the drawing, in the disclosed embodiment of the invention, border frame unit 2 is formed from two oppositely disposed frame halves 10 and 20, each of which provides one of the two side wall members 6 and a portion of base wall member 3. The base wall portions of each of the frame halves is, in turn, connected to a perimetric strip member 11 which also can be made from a suitably rigid chipboard or cardboard material. Perimetric strip 11 is provided with a fold line 12 extending therealong to permit movement of the opposite side wall members toward and away from each other. It is to be noted that the base wall forming portions of each frame half can be connected to perimetric strips 11 by any one of a number of suitable means, for example by gluing or by stapling at selected intervals. It further is to be noted (FIGURE 3) that each frame half 10 and 20 which forms the rectangular border frame member is separated at the four corners of the base wall forming portions as at 13, and that four separate strips 11 are utilized, one on each side of the frame, to facilitate movement of the opposed side wall members 6 toward and away from each other. In addition, it is to be noted (FIGURE 5) that the base wall forming portions of the frame halves can be provided with corner overlap tabs 14 which extend from certain ones of the separated base wall forming portion to overlap with adjacent base wall portions to insure a minimum amount of leakage at the severed corners.

From the aforegoing description, it can be readily seen that with a filter pad such as aforedescribed of expansible-compressible nature inserted in the U-shaped channel formed between side walls 6 and base wall member 3 of the assembled frame 2 that it is possible to compress border frame 2 at the same time that media 9 is compressed for filter unit assembly storage purposes. It will be obvious from the aforegoing description that several of these unit frames can be stacked one upon the other and placed in a shipping carton. It only is necessary to remove these units as the occasion might warrant. Once removed from the shipping carton, the expansible-compressible nature of the media serves to urge the frames to expanded position and the unit is ready for placement into filtering position.

The invention claimed is:

1. A unit filter assembly comprising: a border frame means formed from stiff sheet-like material defining an open upstream and downstream face to permit fluid flow therethrough, said border frame means including connected base and opposed parallel panel-like side wall members arranged so that the inner faces thereof define a continuous channel means; fold means cooperable with said base wall member to permit perimetric folding therealong to facilitate movement of said opposed side wall members of said border frame means toward and away from each other to permit expansion and compression of said continuous channel, said side wall members being so constructed and arranged with said fold means so that said side wall members maintain a substantially parallel relation; and expansible-compressible filter medium means disposed transverse the direction of fluid flow between said upstream and downstream faces of said border frame means, the edges of said filter medium means engaging in the continuous channel of said border frame means.

2. The apparatus of claim 1, said border frame means being of polygonal configuration and having its base wall member severed at the corners to facilitate movement of said opposed side wall members toward and away from each other.

3. The apparatus of claim 1, said base wall member having fold lines extending therealong to permit movement of said opposed side wall members toward and away from each other.

4. The apparatus of claim 1, said border frame means including two oppositely disposed frame halves, each of which provides a side wall member and a portion of said base wall member said base wall portions being connected to a perimetric strip member having a fold line extending therealong to permit movement of said opposite side wall members toward and away from each other.

5. The apparatus of claim 4, said border frame means being of polygonal configuration and having its several sides severed from each other at the corners transverse the base wall member to facilitate movement of said opposed side wall members toward and away from each other.

6. The apparatus of claim 5, and a corner overlap fold means extending from one side of said border wall member in overlap relationship with an adjacent side of said border wall member.

References Cited

UNITED STATES PATENTS

| | | | |
|---|---|---|---|
| 2,019,867 | 7/1933 | Nelson. | |
| 2,138,874 | 12/1938 | Myers | 55—516 X |
| 2,569,575 | 10/1951 | Philipps | 55—519 |
| 2,677,436 | 5/1954 | Mazek | 55—518 |
| 2,988,168 | 6/1961 | Wittemeier et al. | |
| 3,111,489 | 11/1963 | Getzin | 55—517 X |
| 3,142,550 | 7/1964 | Kuehne. | |
| 3,258,900 | 7/1966 | Harms | 210—485 X |

REUBEN FRIEDMAN, Primary Examiner

C. M. DITLOW, Assistant Examiner

U.S. Cl. X.R.

55—495, 516; 210—495